United States Patent

Nakamuta et al.

[15] 3,705,208
[45] Dec. 5, 1972

[54] POLYESTER RESIN AND METHOD OF MANUFACTURING THE SAME

[72] Inventors: Masaji Nakamuta; Michio Tsukui; Junji Mukai; Toshikazu Narahara; Sumio Noguchi, all of Hitachi-shi, Japan

[73] Assignee: Hitachi, Ltd. and Hitachi Chemical Co, Limited, Tokyo, Japan

[22] Filed: Nov. 28, 1969

[21] Appl. No.: 880,926

[30] Foreign Application Priority Data

May 9, 1969 Japan ..................44/35164

[52] U.S. Cl. ............260/861, 260/75 R, 260/75 UA, 260/94.2 M, 260/873
[51] Int. Cl. ......C08f 21/00, C08f 21/02, C08f 27/12, C08g 17/06, C08g 17/10
[58] Field of Search........260/861, 75 UA, 860, 873, 260/75 R, 75 M

[56] References Cited

UNITED STATES PATENTS

| | | |
|---|---|---|
| 2,957,837 | 10/1960 | Smith et al................... 260/22 |
| 3,055,952 | 9/1962 | Goldberg....................260/635 |
| 3,300,544 | 1/1967 | Parker........................260/866 |
| 3,135,716 | 6/1964 | Uranek et al.............260/45.5 |

OTHER PUBLICATIONS

National Distillers; " Hydroxy-terminated Linear Polydienes," Chemical Abstracts, 65, 9105g (1966)
Chen et al.; " Oxidative Polymerization of Polybutadiene and its Derivatives," Chem. Abst. 67, 12310X (1967)

Primary Examiner—William H. Short
Assistant Examiner—E. A. Nielsen
Attorney—Craig, Antonelli, Stewart & Hill

[57] ABSTRACT

A polyester resin obtained by the polycondensation from a hydrogenated polydiene having two ester conjunction forming functions at the ends of a chain thereof and an organic compound having at least one function capable of forming ester conjunction with said forming function. The present disclosure is also directed to a method of manufacturing said polyester resins and polyesters compositions produced thereby.

21 Claims, No Drawings

POLYESTER RESIN AND METHOD OF MANUFACTURING THE SAME

BACKGROUND OF THE INVENTION

The present invention relates to a novel polyester resin having thermosetting properties, a resinous composition containing said polyester resins and a method of producing said polyester resins. The polyester resins of the present invention possess excellent elasticity, electrical and mechanical properties and are very useful in many fields.

A great many kinds of polyester resins have been produced and are used widely as materials for electrical insulation, casting and molding, paints, adhesives, fiber reinforced molding, etc. Because these many polyester resins have a tendency to be deteriorated in mechanical and electrical characteristics such as resistivity, elasticity, water proofing, heat resistance, due to aging, a satisfactory polyester for said purpose has not yet been found. Since the above-mentioned defects are common occurrences in resins of all kinds, the polyester resins are no exception to this fact.

SUMMARY OF THE INVENTION

An object of the present invention is to avoid the prior art disadvantages in polyester resins.

Another object of the present invention is to provide polyester resins and compositions of said resins having excellent softness and elongation properties and small heat degradation characteristics.

A further object of the present invention is to provide polyester resins and resinous compositions containing the same, which can be used to produce cured articles of manufacture having good electrical properties, are water proof, possess crack-occurrence resistance, chemical resistance and weather resistance for a long period of time.

Still another object of the present invention is to provide a thermosetting unsaturated polyester resinous composition containing a suitable copolymerizable vinylmonomer, wherein the thus prepared composition has a liquid state before it is cured, but after curing the composition, the resulting articles have excellent elasticity and elongation properties, good electrical properties, good water proof properties, a small amount of heat degradation, a high resistance to the occurrence of cracks and a good chemical resistance.

A still further object of the present invention is to provide a polyester resin composition useful as a textile material, electrical insulation, casting and molding, adhesives, paints and the like.

Other objects and further scope of applicability of the present invention will become apparent from the detailed description given hereinafter, it should be understood, however, that the detailed description and specific examples, while indicating preferred embodiments of the invention, are given by way of illustration only, since various changes and modifications within the spirit and scope of the invention will become apparent to those skilled in the art from this detailed description.

The polyester resins according to the present invention are characterized by the fact that they comprise the polycondensation product obtained from a hydrogenated polydiene having at least two ester conjunction or linkage forming functions as end groups of the chain and an organic compound having functions capable of forming ester conjunctions with the ester conjunction forming functions. The polyester resin compositions of the present invention can be prepared by mixing the above-mentioned polycondensation product with a suitable vinylmonomer, and if necessary, other ingredients such as a filler, pigments or the like.

Mechanical and physical characteristics of cured articles, which are produced from the polyester resins and compositions of the present invention, may be affected by the hydrogenation ratio of the polydiene having the ester conjunction forming functions. By polycondensation of the hydrogenated polydiene with the organic compound having functions capable of forming ester conjunctions with the ester conjunction forming functions, polyester resins having excellent softness, great elongation, and a very small amount of heat degradation, can be obtained. The hydrogenating ratio contributes to the above-mentioned characteristics in the following manner. When the hydrogenating ratio is larger than 90 percent (i.e., more than 90 percent of the unsaturated bonds in the polydiene have been reacted with the hydrogen), the resulting polyester resins have excellent characteristics. On the other hand, if the hydrogenating ratio is less than 90 percent, the resulting polyester resin has a tendency to increase in heat degration, even though the tensile strength thereof may be improved. As is well known, in case of conventional polydienes, the heat degradation is so great that the polydienes could not effectively be utilized.

According to the experimentations of the present inventors, it has been found that the polydiene having a hydrogenating ratio of about 90 to 99 percent can be readily produced on an industrial scale. If the polydiene of 100 percent hydrogenating ratio is desired, it can be obtained by repeating the hydrogenation process.

Molecular weight of hydrogenated polydienes may also affect characteristics of the polyester resins. For example, if the molecular weight of the polydiene to be used is too small, the elasticity, particularly the elongation of cured substances of the polyester resin will be decreased. On the other hand, if the polydiene having an excessively high molecular weight is used, the tensile strength of the cured substances will not be high enough. Hydrogenated polydienes having a molecular weight of about 1,000 to 4,000 are preferably used in the present invention.

Polydienes which can be employed in the present invention are homopolymers or copolymers produced form such monomers as propanediene, 1,2-butadiene, 1,3-butadiene, 3,4-isoprene,1,3-pentadiene, 1,4-pentadiene, 1,5-hexadiene, etc. and combinations thereof. Polybutadiene is particularly useful in the present invention.

For the synthesis of the polydienes having at least two ester conjunction forming functions, such as a carboxylic or hydroxy group as the end groups, the following process may be employed. The following process is a well known process for introducing the functions onto the end of the polymer chain by using a living polymer (this represents an active polymer). Thus, polymerization of diene compound D is carried out in the presence of a metallic catalyst Me, such as sodium or lithium, to produce the living polymer as follows:

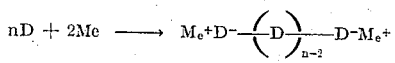

Then a desired ester conjunction forming function can be introduced to the living polymer as follows:

(I)
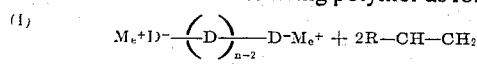

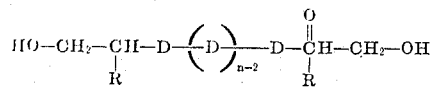

or (II)
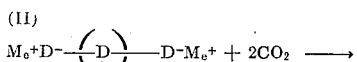

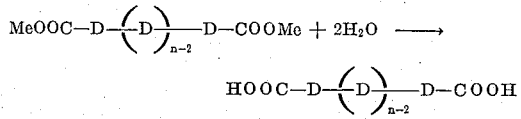

As will be apparent from the above, in case of introducing hydroxyl groups onto the living polymer, a compound that is capable of forming hydroxyl groups is used, whereas when introducing carboxyl groups onto the polymer, carbon dioxide gas is blown into the reactants.

The thus obtained polydiene in accordance with reactions (I) or (II) is hydrogenated as follows:

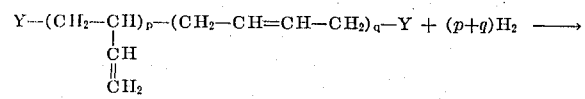

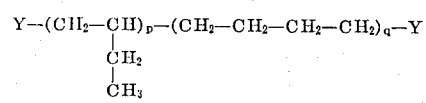

where Y is a hydroxyl or carboxyl group.

As stated above, when the living polymer is employed, desired hydrogenated polydienes can be readily produced. The following process is recommended for hydrogenating the polydiene having the functions, stated above. The polydiene is dissolved in a suitable organic solvent such as methanol, ethanol, cyclohexane, benzene, tetrahydrofurane or the like. As a catalyst for hydrogenation, Raney nickel, Urushiwara catalyst or stabilized nickel, for example, can be used. The hydrogenation is carried out under the presence of the above catalyst at a temperature of about 50° to 300° C. under a hydrogen pressure of about 1 to 500 kg/cm².

Organic compounds as the other ingredient of the poly-ester resin should have at least two functions capable of forming ester conjunctions with the ester conjunction forming functions of the hydrogenated polydiene. In the case where the polydiene has hydroxyl groups an organic acid is used; but in the case where the polydiene has carboxyl groups, glycol is used. If the polydiene has both hydroxyl and carboxyl groups at both the ends of the chain, an organic acid and glycol may be used in a relationship suitable amounts for forming the polyester resins of the present invention. The following compounds are examples of the above organic compound: ethylene glycol, diethylene glycol, triethylene glycol, 1,2-propylene glycol, dipropylene glycol, 1,3-butylene glycol, 2,3-butylene glycol, bisphenol dioxyethyl ether, bis-phenol dioxypropyl ether, neopentyl glycol, 1,4-butylene glycol, 1,6-hexane diol, or the like. On the other hand, the following organic acids are representative of additional compounds which can also be used: saturated organic acid such as adipic acid, sebacic acid, phthalic acid, phthalic anhydride, isophthalic acid, terephthalic acid, 3,6-endomethylene tetrahydro phthalic anhydride, tetrahydro phthalic acid, tetrachloro phthalic anhydride, 3,6-endodichloro methylene tetrachloro phthalic acid, and/or unsaturated organic acid such as maleic acid, maleic anhydride, malic acid, methaconic acid, citroconic acid, itaconic acid, chlorinated maleic acid, and the like.

In case of polycondensation of the hydrogenated polydiene and the organic compound, the following combinations may be employed:

1. The hydrogenated polydiene having hydroxy groups as a glycol ingredient and an organic acid,
2. The hydrogenated polydiene having carboxy groups as the acidic ingredient and a glycol,
3. The hydrogenated polydiene having hydroxyl groups, the glycol and the organic acid, wherein the amounts thoseof are determined in order to maintain an equivalent relationship,
4. The hydrogenated polydiene having carboxyl groups, the organic acid and the glycol in such a relationship as to be chemically equivalent, and
5. The hydrogenated diene polymer having both hydroxyl groups and carboxyl groups, and a glycol and an organic acid present, in an equivalent relationship.

The above ingredients are subjected to polycondensation in the presence of a suitable catalyst such as lead acetate, sodium acetate, or paratoluene sulfonic acid under conventionaltype conditions.

The novel polyester resins in accordance with the present invention can preferably be used as one of the ingredients in an unsaturated polyester resinous composition. That is, the polyester resin can be mixed with a suitable copolymerizable vinyl monomer so as to prepare the thermosettable polyester resinous composition. In an unsaturated polyester resin composition in which the hydrogenated polyester resin and the vinyl monomer can react with each other when subjected to curing the same, at least a part of the polyester resin should have unsaturated bonds or double bonds in the chain. The number of double bonds in the chain can be controlled by the hydrogenating ratio. The larger the number of diene conjunctions or double bonds, the higher the linking density, which produces the harder cured articles. The small the number of diene conjunctions, in other words, the larger the hydrogenating ratio, the smaller the linking density, so that the cured articles in this case have a good elasticity, a small heat degradation, weather resistance, and a water proof property. Though the number of residual diene conjunctions can be selected as desired in accordance with requirements, a practical range is about 50 to 100 percent for the hydrogenating ratio.

Suitable copolymerizable vinyl monomers which are exemplary of those which can be mixed with the polyester resins of the present invention include, for example, styrene, vinyltoluene, divinyl toluene, vinyl acetate, methyl methacrylate, ethyl methacrylate, methylacrylate, or ethyl acrylate. In general, it is preferable to mix 100 parts by weight of the vinyl monomer with 100 parts by weight of the unsaturated polyester resin.

By mixing the vinyl monomer with the polyester resin, the viscosity of the polyester resin composition can be adjusted similarly as in conventional ones.

As a catalyst for the polyester resin composition, a radical forming catalyst, such as benzoyl peroxide, perbenzoic acid, cumen hydroperoxide, dicumyl peroxide, methyl ethyl ketone peroxide, or di-tert-butyl peroxide, is useful, and suitable accelerators such as cobalt naphthalate, dimethyl aniline, a tert-ammonium salt, or like, may further be used, if desired.

In spite of its excellent softness and elasticity which has been completely unpredictable from those of conventional thermosetting resins including polyester resins, the novel polyester resinous composition of the present invention is a thermosetting type resin.

As is well known, suitable fillers such as silica powder, alumina powder, calcium carbonate powder, glass powder, quartz powder or mica powder, pigments such as carbon black, or mold separating agent such as zinc stearate, can be mixed with the novel polyester resin or polyester resin compositions if desired.

A general formula of the polyester resin in accordance with the present invention may be shown as follows: HO—OC—R—COO-R′ O$_n$—H Wherein at least one of R and R′ is a divalent organic group of a hydrogenated polydiene, e.g., polybutadiene, the remaining R or R′ is a a divalent group of an organic compound such as glycol, a saturated acid, or an unsaturated acid, and n is the degree of polycondensation polymerization.

When maleic anhydride HOOC — R — COOH reacts with hydrogenated polybutadiene glycol HO R′ — OH, a polycondensate can be obtained by the following reaction.

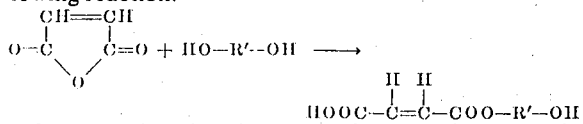

By repeating the above reaction, a polyester resin will be produced as follows:

HOOC — R — COO — R′ — OOC — R — COO — R′ — OOC — R .... R′ — OH

Due to a mixing ratio of acid and glycol, there may be three different situations as follows:

1. In the case of excess acid to glycol, a molecular formula of resulting polyester resins may be represented as follows:

HOOC — R — COO — R′ — OOC — R — COO — R′ — OOC — R .... OOC — R — COOH

2. In the case of glycol excess:

HO — R′ — OOC — R — COO — R′ — OOC — R ... . COO — R′ — OH

3. In the case of an equivalent amount of acid and glycol:

HOOC — R — COO — R′ — OOC — R — COO — R′ , , , , COO -R′ — OH

Most the resulting polyester resins in accordance with the present invention may be represented by the third formula because of the general use of an equivalent mixture of acid and glycol.

DESCRIPTION OF THE PREFERRED EMBODIMENTS

The following examples are given merely as illustrative of the present invention and are not to be considered as limiting.

EXAMPLE I 312 g of butadiene was charged in a reactor vessel containing 23.3 g of sodium metal dispersed in 23.3 g of kerosene, These reactants were maintained in the vessel at a temperature of −70° C. to react the butadiene and sodium. 88.8 g of tetrahydrofuran and 88.8 g of ethylene oxide were then added to the resulting living polymer and reacted. After reaction, desolventing and refining were carried out so that polybutadiene having a molecular weight of 2,000 and a viscosity of 3,000 poises (at 25° C) and having a hydroxyl group at the ends of the chain were obtained. Then 100 g of the resulting polybutadiene, 10 g of Raney nickel catalyst and 100 g of dioxane were charged in an autoclave of 1 l capacity. A reduction reaction was carried out at a temperature of 80° C. and in the presence of 80 kg/cm$^2$ of hydrogen pressure in the autoclave to produce a hydrogenated polybutadiene, which has an iodine value of 14, a 98 percent hydrogenation ratio, a viscosity of 1,720 poises (at 25° C.) and hydroxyl groups as the end group.

Then 100g of the resulting hydrogenated polybutadiene, and 8.3 g of terephthalic acid were subjected to polycondensation in the presence of 0.1 g of sodium acetate and 0.1 g of zinc acetate at 195° C. for 8 hours. After the above reaction, the pressure in the reaction vessel was reduced to about 1 mm/Hg, and then the temperature was gradually elevated to 280° C. to conduct the reaction for 10 hours. The resulting polyester resin had a solution viscosity of 0.48 (measured by dissolving 0.5 g of the polyester resin in 100 cc of benzene at 25° C.) and an acid value of 11.

From the novel polyester resin, a textile was made by rapid cooling thereof. The textile was rich in elasticity, that is about ten times greater than that of polyethylene telephthalate, for example. A film was also produced from the above mentioned polyester resin by a fusion method so that the film had a good water proof property and a high elongation. The electrical characteristics of the polyester resin are the same as shown in Table 2, below.

Meanwhile, 40 g of the above polyester resin was dissolved in 60 g of cresol to prepare a mixture. Then 0.1 g of butyl titanate and 0.1 g of zinc acetate were added to the mixture. The thus prepared composition was coated and burnt on a copper wire. The resulting film formed on the copper wire did not deteriorate when exposed to a 30 percent sodium hydroxide solution and a 30 percent sulfuric acid solution for 48 hours.

EXAMPLE II

In a reactor vessel containing 23.3 g of sodium metal dispersed in 23.3 g of kerosene and 312 g of butadiene, a reaction was carried out at a temperature of −70° C. to produce a living polymer. Then 200g of tetrahydrofuran was charged into the vessel and carbon dioxide gas was blown into the reactants. After the reaction, followed by desolventing and refining, a desired polybutadiene having a molecular weight of 2,000 and a viscisity of 8,000 poises (at 25° C.), and a carboxylic group at the end of the chain, was obtained.

The resulting polybutadiene was subjected to hydrogenation similarly as in Example I so that a hydrogenated polybutadiene having a hydrogenating ratio of 97 percent, an iodine valve of 20 and a viscosity of 3,000 poises (at 25° C.) was obtained.

Then 100 g of the hydrogenated polybutadiene, 9.32 g of maleic anhydride and 11.42 g of propylene glycol were subjected to reaction under a nitrogen atmosphere to produce an unsaturated polyester resin, which had a solution viscosity of 28, an acid value of 4.0 and a mean polymerization degree of 12.

EXAMPLE III 100 g of the hydrogenated polybutadiene produced in Example I and 4.66 g of maleic anhydride were subjected to polycondensation under a nitrogen atmosphere so that an unsaturated polyester resin having a solution viscosity of 0.32, an acid value of 4.8 and a mean molecular weight of 13,000 was obtained. Then 50 g of the hydrogenated polyester resin and 50 g of styrene and 0.5 g of benzoyl peroxide were thoroughly mixed to prepare an unsaturated polyester resin composition. The thus obtained unsaturated polyester resin composition was cured at 80° C. for 2 hours and 100° C. for 4 hours. The mechanical properties and electrical properties of the cured articles are respectively shown in Table 1 and Table 2.

TABLE 1

| | Elongation (%) | Tensile Strength (kg/cm$^2$) |
|---|---|---|
| Before heat degradation | 190 | 135 |
| After heat degradation at 130°C. for 10 days | 130 | 130 |
| After immersion in 60°C. water | 170 | 128 |

TABLE 2

| Measuring Temperature (°C.) | tan δ (×10$^{-2}$) | ε | ζ (Ω-cm) |
|---|---|---|---|
| 20 | 0.10 | 2.60 | — |
| 40 | 0.14 | 2.60 | — |
| 60 | 0.18 | 2.60 | 8 33 10$^{15}$ |
| 80 | 0.22 | 2.55 | 2 × 10$^{15}$ |
| 100 | 0.20 | 2.50 | 7 × 10$^{14}$ |
| 120 | 0.20 | 2.45 | 1 × 10$^{14}$ |
| 140 | 0.25 | 2.42 | 5 × 10$^{13}$ |
| 160 | 0.30 | 2.38 | 9 × 10$^{12}$ |
| 180 | 0.40 | 2.35 | 4 × 10$^{12}$ |

According to the heat degradation tests with respect to the cured articles the heat loss in weight was only about 5 percent.

The unsaturated polyester resin composition prepared in Example 3 is the solventless type. After being cured the resulting article is soft and has a high elongation, like rubber. The cured article has excellent characteristics compared with those of conventional rubber materials, and particularly the electrical properties of the article are superior to those of polyethylene.

EXAMPLE IV 100 g of Poly BDR–45M (a product of Sinclair Petrochemical Industries in the U.S., which is a hydroxyl terminated butadiene homopolymer of 60 percent of 1,4-trans, 20 percent of 1,4-cis and 20 percent of 1,2-vinyl, and having a molecular weight of 2,300) 10 g of Raney nickel as a catalyst, and 100 g of dioxane were charged in an autoclave. Then a reduction reaction (hydrogenation) was carried out at a temperature of 80° C. and a hydrogen pressure of 80 kg/cm$^2$ so that hydrogenated polybutadiene having an iodine value of 53 was produced. 100 g of the hydrogenated product obtained, 2.33 g of maleic anhydride and 1.82 g of sebacic acid were charged into a reactor vessel and subjected to a polycondensation reaction under a nitrogen atmosphere. 50 g of the resulting unsaturated polyester resin and 50 g of styrene containing 0.5 g of benzoyl peroxide were mixed with each other to prepare the desired unsaturated polyester resin composition.

The mechanical properties of the cured articles which were obtained from the above polyester resin composition by the same manner as in Example II are shown in Table 3.

TABLE 3

| | Elongation (%) | Tensile Strength (kg/cm$^2$) |
|---|---|---|
| Before heat degradation | 220 | 100 |
| After heat degradation at 130°C. for 10 days | 75 | 220 |

EXAMPLE V 100 g of poly BD CS–15 (a production of Sinclair Petrochemical Industries in the U.S., which has a hydroxyl group as an end group and is a copolymer of butadiene 75 percent and styrene 25 percent, wherein a ratio of 1,4 trans, 1,2-cis and 1,2-vinyl butadiene are, respectively, 60 percent, 20 percent and 20 percent, and a molecular wiehgt is 2,300), 100 g of dioxane and 10 g of Raney nickel catalyst were introduced into an autoclave. The hydrogenation reaction was carried out under 100 kg/cm$^2$ of hydrogen pressure at 80° C so that 100 g of a hydrogenated polyester having an 87 percent hydrogenating ratio and an iodine value of 45 was obtained. 100 g of the obtained hydrogenated polyester resin, 2.33 g of maleic anhydride and 4.82 % of sebacic acid were charged in a reactor vessel and reacted under a nitrogen atmosphere. Then 50 g of the resulting unsaturated polyester resin was mixed with 50 g of styrene containing 0.5 g of benzoyl peroxide to prepare an unsaturated polyester resin composition. The results of mechanical tests with respect to cured articles obtained from the above composition are shown in Table 4. Electrical properties of the cured articles were the same grades as those in Example III.

TABLE 4

| | Elongation (%) | Tensile Strength (kg/cm$^2$) |
|---|---|---|
| Before heat degradation | 385 | 130 |
| After heat degradation at 130°C. for 10 days | 100 | 210 |

EXAMPLE VI 100 g of hydrogenated polybutadiene produced in Example V and 4.66 of maleic anhydride were charged in a reactor vessel and reacted in a nitrogen atmosphere to produce an unsaturated polyester resin. Then 50 g of the obtained unsaturated polyester resin and 50 g of styrene containing 0.5 g of benzoyl peroxide were thoroughly mixed with each other to prepare a desired unsaturated polyester composition.

The resulting polyester resin composition was cured under the same conditions as mentioned in Example 3, and the mechanical properties of the cured articles are shown in Table 5.

TABLE 5

| | Elongation (%) | Tensile Strength (kg/cm$^2$) |
|---|---|---|
| Before heat degradation | 180 | 144 |
| AFter heat degradation at 130°C. for 10 days | 130 | 180 |

EXAMPLE VII 50 g of unsaturated polyester resin produced in Example V and 50 g of methyl methacrylate containing 0.5 g benzoyl peroxide were mixed with each other to prepare a desired unsaturated polyester resin composition. The thus prepared unsaturated polyester resin composition was cured in the same manner as in Example III, and the mechanical properties of the cured articles are shown in Table 6..

TABLE 6

| | Elongation (%) | Tensile Strength (kg/cm$^2$) |
|---|---|---|
| Before heat degradation | 400 | 140 |
| After heat degradation at 130°C for 10 days | 90 | 200 |

EXAMPLE VIII 50 g of unsaturated polyester resin produced in Example II and 50 g of styrene containing 0.5 g of benzoyl peroxide were thoroughly mixed with each other to prepare a desired polyester resin composition. The thus prepared polyester resin composition was cured in the same manner as in Example III, and the mechanical properties of the cured article are shown in Table 7. The electrical properties were substantially the same grades as those in Example VII.

TABLE 7

| | Elongation (%) | Tensile Strength (kg/cm$^2$) |
|---|---|---|
| Before heat degradation | 170 | 205 |
| After heat degradation at 130°C. for 10 days | 120 | 220 |

EXAMPLE IX 63 g of a conventional unsaturated polyester resin, which is synthesized from 1.1 moles of propylene glycol, 0.35 mole of 2,6-endo-methylene tetrahydrophthalic anhydride, and 0.65 mole of maleic anhydride, and 27 g of styrene and the unsaturated polyester resin produced in Example III were thoroughly mixed with each other to prepare a polyester resin composition.

The prepared composition was cured at 120° C. for one hour and at 150° C. for 4 hours. The thus cured article possesses good crack resistance properties, i.e. no occurrent of cracks under a test of the C-shaped washer method at −20° C.

COMPARATIVE EXAMPLE 100 g of 1,4-butandiol, 54.4 g of maleic anhydride and 112.2 g of sebacic acid were reacted with each other in a nitrogen atmosphere to produce an unsaturated polyester resin. 50 g of the thus prepared polyester resin and 50 g of styrene containing benzoyl peroxide were mixed with each other to prepare the conventional unsaturated polyester resin composition. The polyester resin composition was cured at the same conditions as in Example III, and the mechanical and electrical properties of the cured articles are respectively shown in Table 8 and Table 9.

TABLE 8

| | Elongation (%) | Tensile Strength (kg/cm$^2$) |
|---|---|---|
| Before heat degradation | 10 | 260 |
| After heat degradation at 130°C. for 10 days | 2 | 350 |

TABLE 9

| Testing Temperatures (°C) | tan δ(×10$^{-2}$) | ε | ζ (Ω-cm) |
|---|---|---|---|
| 20 | 1.8 | 4.2 | — |
| 40 | 2.2 | 4.6 | — |
| 60 | 2.8 | 5.0 | 3 × 10$^{12}$ |
| 80 | 2.0 | 5.1 | 8 × 10$^{11}$ |
| 100 | 3.8 | 5.1 | 3 × 10$^{11}$ |
| 120 | 8.8 | 5.2 | 5 × 10$^{10}$ |
| 140 | — | 5.8 | 2 × 10$^{10}$ |

Since the novel polyester resin in accordance with the present invention can produce cured products having an excellent elasticity similar to that of conventional soft rubber and having good mechanical and electrical properties, it is a very useful characteristic for use in many field, particularly electrical insulation. That is, the novel thermosetting polyester resins of the present invention can be used in the insulation of conductors, the packaging or molding of electronic devices such as semiconductor devices, thermistors, printed circuits, transformers, impregnations, coatings, or the like.

In case of applying the novel polyester resins to a molding material in electrical devices, it may not be necessary to coat the cured polyester resin with shock-absorbing material such as silicone rubber because of the excellent elasticity of the cured polyester resin, whereas in conventional molding materials such as epoxy resins a certain undercoating of elastic materials such as silicone rubber have been used to improve the heat cycle characteristics. Furthermore, since the novel polyester resin is in the liquid state, so-called solventless type before being cured, it is very convenient in the use thereof.

The invention being thus described, it will be obvious that the same may be varied in many ways. Such variations are not to be regarded as a departure form the spirit and scope of the invention, and all such modifications as would be apparent to one skilled in the art are intended to be included.

What is claimed is:

1. A polyester resin which comprises the polycondensation product of a hydrogenated polydiene having a molecular weight of about 1,000 to about 4,000 and two ester-forming groups as end groups thereon, said ester-forming groups being the same and selected from the group consisting of carboxyl and hydroxyl groups, and an organic compound containing from two to 18 carbon atoms and having functional groups capable of forming ester linkage with said ester-forming groups on the hydrogenated polydiene, said organic compound being selected from the group consisting of a glycol, an unsaturated carboxylic acid, a saturated carboxylic acid, and mixtures thereof, and said hydrogenated polydiene containing at least two ester-forming groups which are reactive with the functional groups of the organic compound.

2. A polyester resin which comprises the polycondensation product of a hydrogenated polydiene having a molecular weight of about 1,000 to about 4,000 and at least two ester-forming groups as end groups thereon and an organic compound containing from two to 18 carbon atoms and having functional groups capable of forming ester linkages with the ester-forming groups of the hydrogenated polydiene, said polyester resin having the general formula:

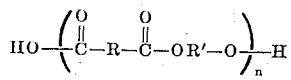

wherein R' is a divalent organic group of a glycol selected from the group consisting of the hydrogenated polydiene having two hydroxyl groups as end groups and said organic compound having two hydroxyl groups, and R is a divalent organic group of an acid selected from the group consisting of the hydrogenated polydiene having two carboxyl groups as end groups and said organic compound selected from the group consisting of a saturated carboxylic acid and an unsaturated carboxylic acid, one of R and R' being the divalent organic group of the hydrogenated polydiene, and n is the degree of polycondensation.

3. A polyester resinous composition which comprises a polyester resin comprising a polycondensation product of a hydrogenated polydiene having a molecular weight of about 1,000 to about 4,000 and two ester-forming groups as end groups thereon, and an organic compound containing from two to 18 carbon atoms and having functional groups capable of forming ester linkages with the ester-forming groups of the hydrogenated polydiene, said polyester resin having the general formula:

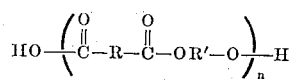

wherein R' is a divalent organic group of a glycol selected from the group consisting of the hydrogenated polydiene having two hydroxyl groups as end groups and said organic compound having two hydroxyl groups, and R is a divalent organic group of an acid selected from the group consisting of the hydrogenated polydiene having two carboxyl groups as end groups and said organic compound selected from the group consisting of a saturated carboxylic acid and an unsaturated carboxylic acid, one of R and R' being the divalent organic group of the hydrogenated polydiene, and n is the degree of polycondensation, and a copolymerizable vinyl monomer.

4. A method for producing a polyester resin which comprises subjecting a hydrogenated polydiene having a molecular weight of about 1,000 to about 4,000 and two ester-forming groups as end groups thereon, said ester-forming groups being the same and selected from the group consisting of carboxyl and hydroxyl groups, to polycondensation with an organic compound containing from two to 18 carbon atoms and having functional groups capable of forming ester linkages with the ester-forming groups of the hydrogenated polydiene, said organic compounds being selected from the group consisting of a glycol, an unsaturated carboxylic acid, and a saturated carboxylic acid and mixture thereof.

5. A polyester resin of claim 2, wherein when an excess amount of acid is utilized, the polyester resin has the general formula:

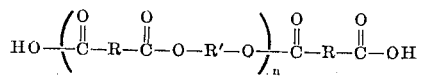

6. The polyester resin of claim 2, wherein when an excess amount of glycol is utilized, the polyester resin has the general formula:

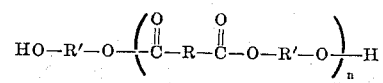

7. The polyester resin of claim 2, wherein when an equivalent amount of acid and glycol is utilized, the polyester resin has the general formula:

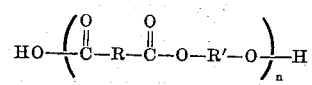

8. The polyester resin of claim 2, wherein the polydiene has a hydrogenation ratio greater than 90 percent.

9. The polyester resin of claim 2, wherein the polydiene is a homopolymer or copolymer of at least one member selected from the group consisting of propanediene, 1,2-butadiene, 1,3-butadiene, 3,4-isoprene, 1,3-pentadiene, 1,4-pentadiene, and 1,5-hexadiene.

10. The polyester of claim 2, wherein the glycol is at least one member selected from the group consisting of ethylene glycol, diethylene glycol, triethylene glycol, 1,3-propylene glycol, dipropylene glycol, 1,3-butylene glycol, 2,3-butylene glycol, bisphenol dioxyethyl ether, bis-phenol dioxypropyl ether, neopentyl glycol, 1,4-butylene glycol, and 1,6-hexane diol.

11. The polyester resin of claim 2, wherein the saturated carboxylic acid is at least one member selected from the group consisting of adipic acid, sebacic acid, phthalic acid, phthalic anhydride, isophthalic acid, terephthalic acid, 3,6-endomethylene tetrahydro phthalic anhydride, tetrahydro phthalic acid, tetrachloro phthalic anhydride, and 3,6-endo-dichloro methylene tetra-chloro phthalic acid.

12. The polyester resin of claim 2, wherein the unsaturated carboxylic acid is at least one member selected from the group consisting of maleic acid, maleic anhydride, malic acid, methaconic acid, citraconic acid, itaconic acid and chlorinated maleic acid.

13. The polyester resin of claim 2, wherein the hydrogenated polydiene has hydroxyl groups as the ester forming groups.

14. The polyester resin of claim 2, wherein the hydrogenated polydiene has carboxylic groups as the ester forming groups.

15. The polyester resin of claim 2, wherein the hydrogenated polydiene is hydrogenated polybutadiene.

16. The composition of claim 3, wherein the vinyl monomer is selected from the group consisting of styrene, vinyl toluene, divinyl toluene, vinyl acetate, methyl methacrylate, ethyl methaacrylate, methyl acrylate and ethyl acrylate.

17. The composition of claim 3, further containing a filler.

18. The composition of claim 3, wherein the hydrogenated polydiene is hydrogenated polybutadiene.

19. The composition of claim 3, wherein the hydrogenated polydiene has a hydrogenation ratio of greater than 90 percent.

20. The method of claim 4, wherein the polydiene is polybutadiene.

21. The method of claim 4, wherein the polyester resin is mixed with a copolymerizable vinyl monomer.

* * * * *